(12) United States Patent
Ponomarev et al.

(10) Patent No.: US 9,023,449 B2
(45) Date of Patent: May 5, 2015

(54) COMPOSITE REINFORCEMENT

(75) Inventors: Andrey Nikolaevich Ponomarev, St. Petersburg (RU); Aleksandr Pavlovich Beloglazov, Moscow (RU)

(73) Assignee: Virtum i Sverige AB, Stockholm (SE)

( * ) Notice: Subject to any disclaimer, the term of this patent is extended or adjusted under 35 U.S.C. 154(b) by 761 days.

(21) Appl. No.: 13/375,828

(22) PCT Filed: May 31, 2010

(86) PCT No.: PCT/RU2010/000290
§ 371 (c)(1),
(2), (4) Date: Dec. 2, 2011

(87) PCT Pub. No.: WO2010/140927
PCT Pub. Date: Dec. 9, 2010

(65) Prior Publication Data
US 2012/0076969 A1   Mar. 29, 2012

(30) Foreign Application Priority Data
Jun. 2, 2009 (RU) .................. 2009120761

(51) Int. Cl.
*B32B 1/04* (2006.01)
*E04C 5/07* (2006.01)
*C04B 28/02* (2006.01)
*C04B 111/40* (2006.01)

(52) U.S. Cl.
CPC . *E04C 5/07* (2013.01); *C04B 28/02* (2013.01); *C04B 2111/40* (2013.01); *Y10S 977/70* (2013.01); *Y10S 977/753* (2013.01)

(58) Field of Classification Search
None
See application file for complete search history.

(56) References Cited

U.S. PATENT DOCUMENTS

| 7,285,167 | B2  | 10/2007 | Ogden |
| 8,460,763 | B2* | 6/2013  | Kouznetsov et al. ......... 427/569 |
| 2005/0155523 | A1 | 7/2005 | Ogden |
| 2011/0008576 | A1* | 1/2011 | Kouznetsov et al. ......... 428/156 |

FOREIGN PATENT DOCUMENTS

| CN | 101215131 A | 7/2008 |
| DE | 20 2007 00267 | 6/2007 |
| DE | 20 2007 002 676 U1 | 7/2007 |
| EP | 1 054 036 | 11/2000 |
| JP | 2005008486 A | 1/2005 |
| RU | 2 054 508 | 2/1996 |
| WO | 2008/101726 A1 | 8/2008 |

OTHER PUBLICATIONS

International Search Report for corresponding patent application No. PCT/RU2010/000290 dated Nov. 26, 2010.
Chinese Office Action and Search Report mailed Nov. 7, 2013 in the corresponding Chinese Application No. 201080024179.4 with English translation.
Han, Jianlong, "Nanosilica and its application in concrete and mortar", New Building Materials, Oct. 31, 2005, pp. 19-21.

* cited by examiner

Primary Examiner — Sheeba Ahmed
(74) Attorney, Agent, or Firm — Renner, Otto, Boisselle & Sklar, LLP

(57) ABSTRACT

Composite reinforcement "Astrofleks" is used in building structures for reinforcement of insulation wall panels, solid concrete and prefabricated buildings. The composite reinforcement comprises the outer layer (1), inside of which the inner layer (2) is placed, on the outer surface of outer layer (1) there are relief elements (3) to improve adhesion of nanocomposite reinforcement with concrete. According to embodiment number 1, layer (1) is made of nanocomposite carbon in which the polymer matrix is modified by carbon nanostructures. Layer (2) is made of lightweight highly mobile concrete, containing in its composition components in the following ratio (% wt.): Cement—20-50; filler—70-30; plasticizer—0.02-2.5; water—the rest. According to embodiment number 2, layer (1) is made of nanocomposite carbon in which the polymer matrix is modified by polyhedral multilayered carbon nanostructures of fulleroid type at a ratio of 0.01-10% by weight of the polymer matrix. Layer (2) is made of lightweight highly mobile nanobeton containing in its composition components in the following ratio (% wt.): Cement—24-48; filler—60-30; modified basalt fiber—2-6; plasticizer—0.05-3.0; water—the rest. According to embodiment number 3, a layer (1) is made of nanocomposite carbon. Layer (2) is made of lightweight f highly mobile nanobeton containing in its composition components in the following ratio (% wt.): Cement—20-50; filler—50-20; plasticizer—0.02-2.5; water-soluble epoxy resin—0.2-25; water—the rest. Concrete mixture for a lightweight highly mobile nanobeton additionally contains a water soluble epoxy resin.

9 Claims, 2 Drawing Sheets

COMPOSITE REINFORCEMENT

FIELD OF THE INVENTION

The invention relates to the construction, namely, to the composite reinforcement, which is used in building structures for reinforcement of thermo-insulating wall panels, solid concrete and prefabricated buildings, as well as for use in constructive elements of buildings as separate rods and meshes.

BACKGROUND OF THE INVENTION

Among advanced building materials, increasingly used in construction can be named a group of polymer composite and cementcontaining materials (PCM and CM), of which bridges and buildings are build, they are used for the reconstruction and strengthening of existing structures. With such positive qualities as high strength and high resistance to corrosion, including the radiation one, these materials allow to create new constructions and technologies to build bridges, buildings and other constructions. The widespread use of polymer and polymer composite materials in modern technology is linked with the development of new methods for modification of PCM or certain components of these compositions. The main trend of industry of PCM now lies in the development and organization of the production of PCM, modified by various nanomaterials, the so-called nanocomposites.

Known is laminated composite reinforcing rod made in the form of a metal core, laminated by composite composition in a form of a fiber of material, dispersed in the matrix of epoxy resin (see U.S. Pat. No. 5,613,334 for an invention, MPK6 E 04L 5/08, Mar. 25, 1997.).

This composite reinforcing rod has a low heat resistance (120-150° C.) and does hot provide the necessary rigidity at temperatures above 300° C.

The closest to the present invention by combination of essential features is the rod for concrete reinforcement, which contains an outer layer and inner layer, placed inside the external (see RU 2,054,508 for an invention, MPK6 E 04S 5/07, Feb. 20, 1996). This composite reinforcing rod also has a low thermal resistance (120-200° C.) and does not provide the necessary rigidity at temperatures above 300° C.

SUMMARY OF THE INVENTION

The technical result of the use of the proposed set of the inventions is the increase of the thermal stability when heated above 300° C., with maintaining of high strength characteristics.

This technical result is achieved by the fact that according to embodiment number 1, in composite reinforcement, which contains an outer layer and inner layer, placed inside the outer layer, the outer layer is made of nanocomposite carbon, in which the polymer matrix is modified by carbon nanostructures, and the inner layer is made of lightweight highly mobile concrete containing in its composition components with the following ratio (% wt.):

| Cement | 20-50 |
|---|---|
| Filler | 70-30 |
| plasticizer | 0.02-2.5 |
| water | the rest. |

This technical result is achieved by the fact that according to the embodiment number 2, the composite reinforcement containing an outer layer and inner layer, placed inside of the outer layer, the outer layer is made of carbon nanocomposite, in which the polymer matrix is modified by polyhedral multi-layered carbon nanostructures of the fulleroid type (astralens) in the ratio 0.01-10% of the weight of the polymer matrix and an inner layer is made of lightweight highly mobile nanobeton that contains in its composition components in the following ratio (% wt.):

| Cement | 24-48 |
|---|---|
| Filler | 60-30 |
| modified basalt fibers | 2-6 |
| plasticizer | 0.05-3.0 |
| water | the rest. |

This technical result is achieved by the fact that according to the embodiment number 3, the composite reinforcement containing an outer layer and inner layer, placed inside of the outer layer, the outer layer is made of nanocomposite carbon fiber and the inner layer is made from light highly mobile nanocomposite beton, that contains in its composition components in the following ratio (% wt.):

| Cement | 20-50 |
|---|---|
| Filler | 50-20 |
| plasticizer | 0.02-2.5 |
| water-soluble epoxy resin | 0.2-25 |
| water | the rest. |

Besides, in the composite reinforcement on embodiments 1, 2, 3 the surface of the external layer has fire-proof coating; cross section of the outer layer and inner layer has an arbitrary form.

BRIEF DESCRIPTION OF DRAWINGS

On the FIG. 1 the composite reinforcement is shown, general view;

on the FIG. 2—section A-A on the FIG. 1;

Figure 1:
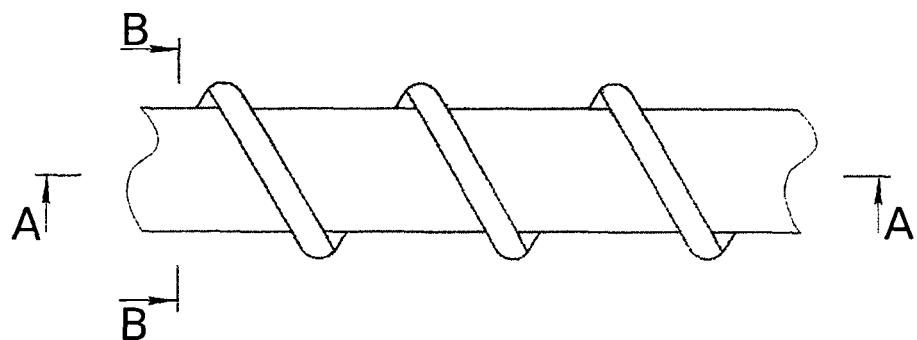
Figure 2:
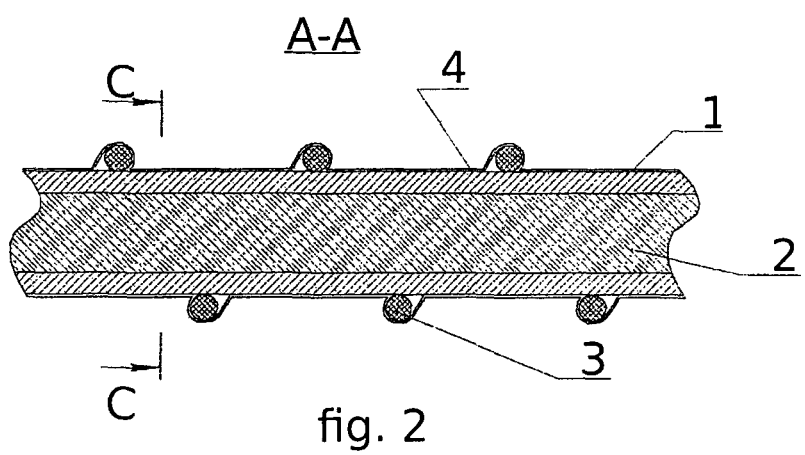
Figure 3:
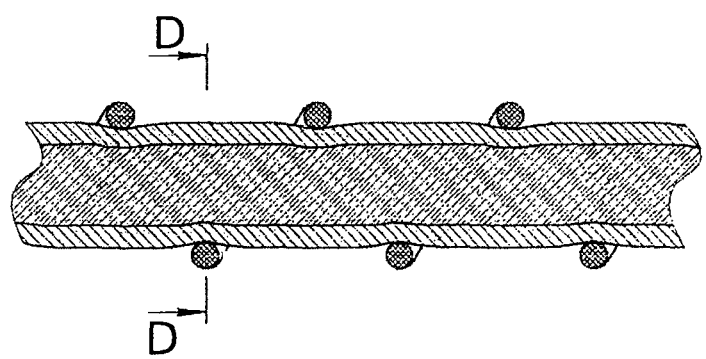
Figure 4:
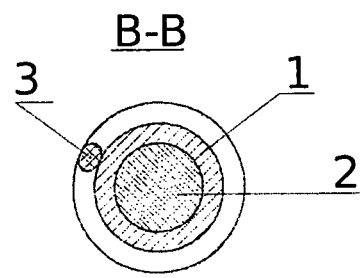
Figure 5:
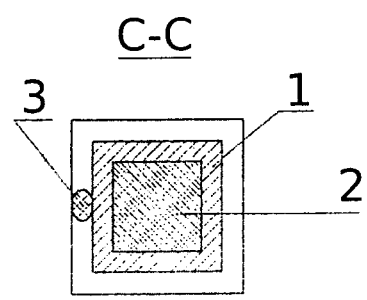
Figure 6:
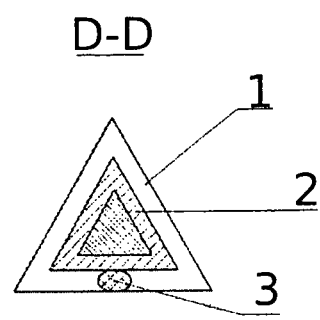

on the FIG. 3 the composite reinforcement in the section is shown;

on the FIG. 4—the section B-B on the FIG. 1;

on the FIG. 5—the section C-C on the FIG. 2;

on the FIG. 6—the section D-D on the FIG. 3.

DETAILED DESCRIPTION OF THE INVENTION

The composite reinforcement "Astrofleks" on embodiments 1, 2, 3 consists of the outer layer 1, on the outer surface of the outer layer 1 the relief elements 3 are made to improve the adhesion of the nanocomposite reinforcement with the concrete, during the production of building details by this method. Cross section of the outer layer 1 and the inner layer 2 has an arbitrary shape, for example round (FIG. 4), rectangular (FIG. 5), and triangular (FIG. 6). Depending on the application the surface of the outer layer 1 of a composite reinforcement can be equipped with the fire-proof coating 4. Fire-proof coating 4 is made on the basis of TEG and water glass, what allows increasing of the heat resistance of the reinforcement.

According to the embodiment number 1, the outer layer 1 is made of carbon nanocomposite, in which the polymer matrix is modified by carbon nanostructures based on epoxy, polyester or polyimide polymers, such as polyhedral multi-layer carbon nanostructures of the fulleroid type (astralens) at a ratio of 0.01-10% of the weight of the polymer matrix. The inner layer 2 is made of a highly mobile lightweight concrete, containing in its composition components in the following ratio (% wt.): Cement—20-50; filler—70-30; plasticizer—0.02-2.5; water—the rest.

As filler the inner layer 2 contains a mixture of gravel with sand and mixture of gravel with aluminum silicate micro spheres.

As plasticizer the inner layer 2 contains polynaphthalenemethylenesulfonat sodium—organic synthetic substance based on the product of condensation of naphthalene sulphonic acid and formaldehyde.

Other component masses percentage doesn't permit to get composite concretes, from which it is technologically possible to produce the inner layer of the claimed nanocomposite reinforcement with the demanded properties.

According to embodiment number 2, the outer layer 1 is made of nanocomposite carbon in which the polymer matrix is modified by polyhedral multilayer carbon nanostructures of fulleroid type (astralenes) in ratio 0.01-10% of polymeric matrix's mass.

According to embodiment number 2, the outer layer 1 is made of nanocomposite carbon, in which the polymer matrix is modified by polyhedral multi-layered carbon nanostructures of fulleroid type (astralens) at ratio of 0.01-10% of the polymer matrix's weight. As a polymer matrix of the outer layer 1 are used solidified epoxy resins, for example, ED-20, epoxy lacquer resin DER 531, epoxyphenol, polyester resins, etc.

The inner layer 2 is made of lightweight highly mobile nanocomposite concrete containing in its composition components in the following ratio (% wt.): Cement—24-48; filler—60-30; modified basalt fiber—2-6; plasticizer—0.05-3.0; water—the rest. As filling the inner layer 2 contains a mixture of gravel with sand and mixture of gravel with aluminum silicate micro spheres.

As the plasticizer the inner layer 2 contains the plasticizer of oligocarboxid type, such as MF 2642. Using of this filler and plasticizer permits to obtain the increase of heat resistance.

The presence of the modified basalt fiber in composition of the internal layer 2 allows to obtain particulate-reinforced nanocomposite concrete with a high work of destruction and increased resistance to bending. Modified basalt fiber is obtained by mixing of chopped basalt fiber of diameter 8-10 microns and length 100-500 microns with polyhedral multi-layered carbon nanostructures of fulleroid type—astralens and multi-layered carbon nanotubes obtained by arc sputtering of graphite, followed by oxidative cleaning of the cathode deposit, taken in quantity 0.0001-0.005 part of modifier to 1 part of basalt fiber. These nanostructures are mixed with the basalt fiber in a crusher in the process of basalt fiber crushing.

Modified basalt fiber is modified by the surface by multilayer carbon nanostructures of fulleroid type (astralens) at a ratio of 0.001-0.1% wt.

Other percentage ratio of the masses of the components of the inner layer and the ratio of polyhedral multilayer carbon nanostructures to the mass of the polymer matrix does not permit to obtain composite carbon plastics and concretes, of which it is technologically possible to prepare the outer and inner layers of the claimed nanocomposite reinforcement with the required properties.

According to the embodiment number 3, the outer layer 1 is made of nanocomposite carbon, in which the polymer matrix is modified by carbon nanostructures based on epoxy, polyester, or polyimide polymers, such as polyhedral multilayer carbon nanostructures of fulleroid type (astralens) in ratio 0.01-10% of the mass of the polymer matrix. The inner layer 2 is made of lightweight highly mobile nanobeton, containing in its composition components in the following ratio (% wt.): cement—20-50; filler—50-20; plasticizer—0.02-2.5; water-soluble epoxy resin—0.2-25; water—the rest. As filler the inner layer 2 contains a mixture of gravel with sand and mixture of gravel with aluminum silicate micro spheres.

As plasticizer the inner layer 2 contains plasticizer of oligocarboxid type, for example Zica 1250. The use of filler and plasticizer allows the achieving of the increased heat resistance.

Concrete mixture for lightweight highly mobile nanobeton additionally contains water compatible epoxy composition, for example, epoxy resin ED-20, hardened by water-soluble hardener of "Aramin" type that is necessary to improve the adhesion at the boundary of the layer 1 and the layer 2.

Other percentage ratio of masses of the components does not permit to achieve composite concretes, of which it is technologically possible to produce the inner layer of the claimed nanocomposite reinforcement with the desired properties.

Composite reinforcement "Astrofleks" that corresponds to the embodiments number 1, 2, 3 can be produced in two ways:

a). Firstly the inner layer 2 is produced. For this dry components of concrete mixture are loaded into the mixer and mixed within 5-15 minutes. Plasticizer is dissolved in water, the solution is loaded in a mixer and the mixture is mixed within 5-15 minutes. Then the concrete mixture is poured into the mold and kept in the mold up to the setting of the concrete mortar and up to the achievement of necessary hardness. After that the carbon tape or twisted strip impregnated with binding agent is wound on the outer surface of the layer 2 and the binding agent is set. It is also possible to make an outer layer 1 using carbon prepregs-carbon tape or twisted strip, impregnated with binding agent and dried. The outer layer 1 is made with necessary surface relief b). Firstly the outer layer 1 is produced. For this carbon twisted strip or tape impregnated with binder and hardener, in which previously, under conditions of ultrasonic field were introduced carbon nanoparticles of fulleroid type, is spirally wound with specified angle (0°-30° on the mandrel, for example, (Teflon) fluoroplastic rod, then the binder is set. Dry components of concrete mixture are loaded in a mixer, mixed within 5-15 minutes and then the water solution of the plasticizer and water to its required quantity are added. The mixture is stirred again and the received concrete solution is poured in the volume, which is formed inside of the outer layer 1 after removal of the mandrel.

The received structure is kept up to mortar setting and up to necessary hardness. It is also possible to make the external layer 1 using carbon prepregs. Prepreg is given the form of a closed surface corresponding to the form of the outer layer 1 and a binder is hardened by heating to a certain temperature. Then by the above described method the volume formed by the outer layer 1 is filled with concrete mixture and is kept up to setting and achievement of necessary hardness. If composite rod is manufactured by this method such choice of parameters of hardness of inner and outer layers is possible that when the relief is applied a partial deformation of the outer layer takes place (sinking to a depth of 0.1-0.5 mm) without losing the integrity of the outer layer (FIG. 3). Such a composite rod has the best characteristics at the test for pulling the reinforcement from reinforced concrete detail.

Then the characteristics of the material in the resulting product are determined. For this samples of standard size are taken and compression and bending tests at various temperatures are used.

The properties of composite reinforcement "Astrofleks" for embodiment number 1 are given in Table 1.

TABLE 1

| Composition and parameters | | Composition, mass % | | |
|---|---|---|---|---|
| | | 1 | 2 | 3 |
| Internal layer composition, % wt | Cement | 20 | 35 | 50 |
| | Filler | 65 | 39.7 | 10 |
| | Plasticizer | 0.02 | 0.3 | 2.5 |
| | Water | 19.98 | 15 | 17.5 |
| External layer composition, % wt | Carbon twisted stripe (tape) | 69.997 | 58.8 | 45 |
| | Polymeric matrix | 30 | 40 | 50 |
| | nanostructures of fulleroid type | 0.003 | 1.2 | 5 |
| Physical-mechanical specifications of reinforcements | Compressive strength, MPa | 150 | 190 | 100 |
| | bending strength, MPa | 12 | 18 | 8 |
| | Heat stability, ° C. | 560 | 630 | 710 |

As can be seen from Table 1, modification of layer 2 by aluminosilicate micro spheres and modification of the polymer matrix of layer 1 by fulleroid nanostructures has led to a significant increase of heat resistance while maintaining sufficiently high strength characteristics.

TABLE 2

| Composition and parameters | | Composition, % wt | | |
|---|---|---|---|---|
| | | 1 | 2 | 3 |
| Internal layer composition, % wt | Cement | 24 | 35 | 48 |
| | Filler | 60 | 45 | 30 |
| | Basalt fiber | 2 | 6 | 4 |
| | Plasticizer | 0.05 | 0.3 | 3 |
| | Water | 13.95 | 13.7 | 15 |
| External layer composition, % wt | Carbon twisted stripe (tape) | 49.995 | 58.8 | 67 |
| | Polymeric matrix | 50 | 40 | 30 |
| | nanostructures of fulleroid type | 0.005 | 1.2 | 3 |
| Physical-mechanical specifications of reinforcements | Compressive strength, MPa | 120 | 210 | 250 |
| | bending strength, MPa | 13 | 22 | 24 |
| | Heat stability, ° C. | 720 | 630 | 490 |

The properties of composite reinforcement "Astrofleks" for embodiment number 2 are shown in Table 2.

As seen from Table 2, the modification of polymer matrix of the layer 1 by fulleroid nanostructures and layer 2 by basalt micro fiber led to an increase of the strength characteristics while maintaining high heat resistance.

The properties of composite reinforcement "Astrofleks" for embodiment number 3 are listed in Table 3.

TABLE 3

| Composition and parameters | | Composition, mass % | | |
|---|---|---|---|---|
| | | 1 | 2 | 3 |
| Internal layer composition, % wt | Cement | 20 | 35 | 50 |
| | Filler | 50 | 35 | 20 |
| | Plasticizer | 0.02 | 1.2 | 2.5 |
| | Water-compatible epoxies resin | 25 | 12 | 0.2 |
| | Water | 4.88 | 16.8 | 27.3 |
| External layer composition, % wt | Carbon twisted stripe (tape) | 49.995 | 58.8 | 67 |
| | Polymeric matrix | 50 | 40 | 30 |
| | nanostructures of fulleroid type | 0.005 | 1.2 | 3 |
| Physical-mechanical specifications of reinforcements | Compressive strength, MPa | 120 | 260 | 310 |
| | bending strength, MPa | 12 | 25 | 30 |
| | Heat stability, ° C. | 480 | 560 | 630 |

As shown in Table 3, the introduction to the composition of the inner layer 2 of the water-compatible epoxy resin led to an increase of the strength characteristics while maintaining sufficiently high heat stability.

The composite reinforcement "Astrofleks" of the embodiments number 1, 2, 3 works in following way:

Composite reinforcement (rods) is installed and filled with concrete and when the concrete has necessary strength, details produced and reinforced by this method can be used for building constructions.

From the separate rods of a composite reinforcement are assembled flat or volume structures with the help of composite couplings and (or) shrink film. The assembled structure is poured with concrete or used independently as load-bearing construction element.

Thus, the composite reinforcement "Astrofleks" made of nanocomposite carbon-fiber outer layer 1 and lightweight inner nanobeton layer 2 has a higher heat resistance and high strength. Unlike concretes, reinforced with steel reinforcement, concretes, reinforced by polymer composite reinforcement, are not subject to corrosion. Application of the core structure increases physical-mechanical characteristics, as well as leads to a reduction of tension in structures.

The use of composite reinforcement "Astrofleks" allows to reduce essentially the weight of construction, to increase corrosion resistance, resistance to aggressive environments, enhance the architectural possibilities, to reduce labor costs, being ahead of many properties of traditional material.

The invention claimed is:

1. Composite reinforcement containing an outer layer and an inner layer, wherein the outer layer is made of nanocomposite carbon, in which the polymer matrix is modified by carbon nanostructures and the inner layer is made of a concrete, containing in its composition components in the following ratio (% wt.):

| | |
|---|---|
| cement | 20-50 |
| filler | 70-30 |
| plasticizer | 0.02-2.5 |
| water | the rest. |

2. The composite reinforcement according to claim 1, wherein the surface of the outer layer is equipped with a fire-proof coating.

3. The composite reinforcement according to claim 1, wherein the cross section of the outer layer and inner layer has an arbitrary shape.

4. Composite reinforcement containing an outer layer and an inner layer, wherein the outer layer is made of nanocomposite carbon in which the polymer matrix is modified by polyhedral multilayer carbon nanostructures of fulleroid type at a ratio of 0.01-10% by weight of the polymer matrix and the inner layer is made of nanobeton containing in its composition components in the following ratio (% wt.):

| | |
|---|---|
| cement | 24-48 |
| filler | 60-30 |
| modified basalt fibers | 2-6 |
| plasticizer | 0.05-3.0 |
| water | the rest. |

5. Composite reinforcement of claim 4, wherein the surface of the outer layer has the fire-proof coating.

6. Composite reinforcement claim 4, wherein the cross section of the outer layer and inner layer has an arbitrary shape.

7. Composite reinforcement containing an outer layer and an inner layer, wherein the outer layer is made of nanocomposite carbon fiber and the inner layer is made of nanobeton containing in its composition components in the following ratio (% wt.):

| | |
|---|---|
| cement | 20-50 |
| filler | 50-20 |
| plasticizer | 0.02-2.5 |
| water compatible epoxy resin | 0.2-25 |
| water | the rest. |

8. Composite reinforcement of claim 7, wherein the surface of the outer layer has a fire-proof coating.

9. The composite reinforcement according to claim 7, wherein the cross section of the outer layer and inner layer has an arbitrary shape.

\* \* \* \* \*